US008382083B2

(12) United States Patent
Martin

(10) Patent No.: US 8,382,083 B2
(45) Date of Patent: Feb. 26, 2013

(54) CLAMPING APPARATUS

(75) Inventor: David Martin, Dearborn, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 13/086,651

(22) Filed: Apr. 14, 2011

(65) Prior Publication Data

US 2012/0263518 A1 Oct. 18, 2012

(51) Int. Cl.
*B23Q 3/08* (2006.01)
*B23Q 1/00* (2006.01)
*B25B 1/04* (2006.01)
*B25B 5/04* (2006.01)
*F16B 2/12* (2006.01)

(52) U.S. Cl. ............... 269/32; 269/24; 269/49; 269/239

(58) Field of Classification Search .................... 269/32, 269/24, 239, 49, 20, 27
See application file for complete search history.

(56) References Cited

U.S. PATENT DOCUMENTS 6,364,301 B1 * 4/2002 Takahashi ........................ 269/32
6,557,841 B2 * 5/2003 Dellach et al. .................. 269/32
6,648,317 B2 * 11/2003 Takahashi et al. .............. 269/32
6,997,447 B2 * 2/2006 Fukui .............................. 269/32
7,182,326 B2 * 2/2007 McIntosh et al. ............... 269/32
7,467,788 B2 * 12/2008 McIntosh et al. ............... 269/32
2004/0021260 A1 * 2/2004 Migliori .......................... 269/32
2008/0179804 A1 * 7/2008 McIntosh et al. ............... 269/32
2008/0237957 A1 * 10/2008 Waldorf .......................... 269/27
2008/0315478 A1 * 12/2008 McIntosh ........................ 269/49
2009/0236785 A1 * 9/2009 McIntosh et al. ............... 269/32
2010/0044942 A1 * 2/2010 Tamai ............................. 269/32

FOREIGN PATENT DOCUMENTS

DE 10 2004 007 465 9/2005
EP 1 563 956 2/2005

* cited by examiner

*Primary Examiner* — Lee D Wilson
*Assistant Examiner* — Alvin Grant
(74) *Attorney, Agent, or Firm* — Harness, Dickey & Pierce, P.L.C.

(57) ABSTRACT

A clamping apparatus has a shaft (2) mounted in a housing element (1). The shaft (2) is rotated about an axis of rotation. One end of the shaft (2) is connected to a drive mechanism (3) disposed in the housing element (1). The other end of the shaft (2) is connected to an actuating element (4), in a torsion-proof manner. The shaft (2) implements a rotational and translational movement to the actuating element (4). The shaft (2) is mounted so that it can be displaced perpendicular to the axis of rotation in a guide element (5) connected to the drive mechanism (3). The guide element (5) is rotatably mounted in the housing element (1).

15 Claims, 4 Drawing Sheets

CLAMPING APPARATUS

FIELD

The disclosure relates to a clamping apparatus and, more particularly, to a shaft mounted in a housing so that it is displaceable perpendicular to its axis of rotation in a guide element, connected to the drive mechanism, to implement a rotational and translational movement to the clamp actuating element.

BACKGROUND

DE 10 2004 007 465 A1 illustrates a clamping apparatus. It discloses a shaft that is mounted in a housing element. The shaft can be rotated about an axis of rotation (pivot axis). The shaft, on the one hand, is connected to a drive mechanism disposed in the housing element and, on the other hand, is connected to an actuating element (in particular a clamping tool with clamping arm) in a torsion-proof manner. In particular, with reference to FIGS. 3 and 4 of DE 10 2004 007 465 A1, the drive mechanism, in one case, includes a so-called toggle lever mechanism (FIG. 3) and in the other case a curved guide (FIG. 4).

The clamping apparatuses are used, for example, in automobile manufacture to firmly clamp parts to be welded together.

SUMMARY

It is the object of the disclosure to improve a clamping apparatus of the above type.

The object is achieved by a clamping apparatus that comprises a shaft mounted in a housing element. The shaft is rotated about an axis of rotation. One end of the shaft is connected to a drive mechanism. The drive mechanism is disposed in the housing element. The other end of the shaft is connected to an actuating element in a torsion-proof manner. The shaft implements a rotational and translational movement to the actuating element. The shaft is mounted so that it can be displaced perpendicular to the axis of rotation. The shaft is positioned in a guide element that is connected to the drive mechanism. The guide element is rotatably mounted in the housing element.

According to the disclosure, the shaft, which implements a rotational and translational movement of the actuating element, is mounted so that it can be displaced perpendicular to the axis of rotation in a guide element. The guide element is connected to the drive mechanism. The drive mechanism is rotatably mounted in the housing element.

Further, according to the disclosure, rotary or rotational movement of the shaft can be superposed with a displacement or translational movement. This additional degree of freedom has an advantage that it is possible to initially bring, for example, the clamping arm to the workpiece or towards the workpiece with a simple pivoting movement. The translational movement carries out or concludes the clamping process.

This increased technical effort has the advantage that the actuating element can be placed parallel onto the workpiece. The result is that edge imprints, which increasingly occur during purely rotative movement of the actuating element, can be avoided. This aspect takes into account the requirement to provide as little excess material as possible at the parts to be welded. The result is that clamping points are increasingly positioned on surfaces that are subsequently visible. It follows that imprints of the actuating element cannot specifically remain at these points.

Further areas of applicability will become apparent from the description provided herein. The description and specific examples in this summary are intended for purposes of illustration only and are not intended to limit the scope of the present disclosure.

The clamping apparatus according to the invention including its advantageous further developments according to the dependent patent claims will be explained in detail hereinafter with reference to the diagrammatic representation of two exemplary embodiments.

DRAWINGS

The drawings described herein are for illustrative purposes only of selected embodiments and not all possible implementations, and are not intended to limit the scope of the present disclosure.

DETAILED DESCRIPTION

The clamping apparatus shown in FIGS. 1 to 10 include a shaft 2 rotatably mounted in a housing element 1 about an axis of rotation. One end of the shaft is connected to a drive mechanism 3 disposed in the housing element 1. The other end is connected to an actuating element 4 or clamping element, in a torsion-proof manner. The drive mechanism 3 is optionally configured as a manual drive (not shown additionally), a pneumatic or hydraulic piston drive (See FIGS. 1 to 8) and/or an electrical rotary drive (see FIGS. 9 and 10).

In all embodiments of the clamping apparatus according to the disclosure, the shaft 2, which implements a rotational and a translational movement of the actuating element 4, is mounted so that it can be displaced perpendicularly to the axis of rotation in a guide element. The guide element is connected to the drive mechanism 3. The guide mechanism 3 is mounted rotatably in the housing element 1.

According to the disclosure, as already explained, and is also apparent from the figures, it is possible to pivot the actuating element or the clamping arm and to move it in a translational manner. Specifically, in particular, it moves towards the end of the clamping movement. Conversely, during the release initially a displacement movement and finally the pivoting movement takes place. This takes place, in particular, in order to avoid scratches or imprints on the workpiece during firm clamping.

The displacement movement typically covers a range of a few millimeters whereas the pivoting range is at least 90°, preferably up to at least 150°. As is apparent from the figures, the axis of rotation always moves together with the shaft 2 (parallel displacement).

Figure 5:
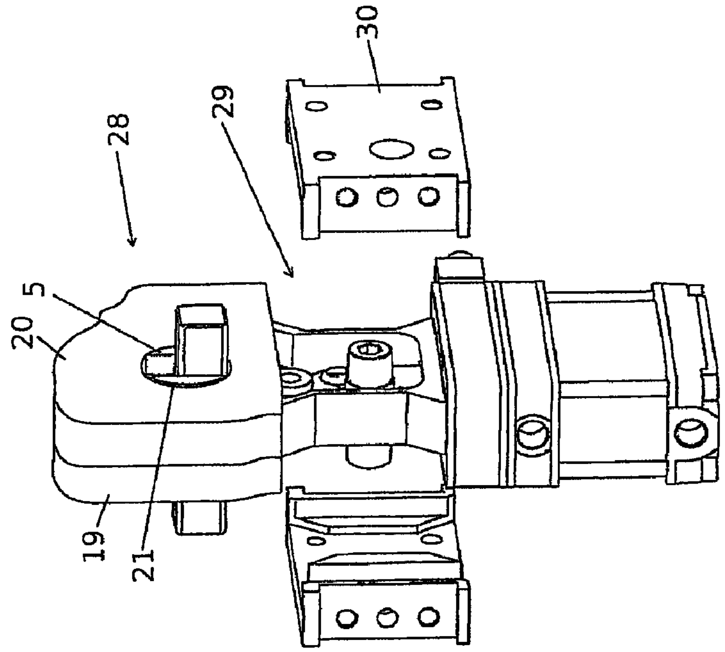
FIG. 5 is an exploded perspective view of the clamping apparatus according to FIG. 1 in a clamping position.
Figure 4:
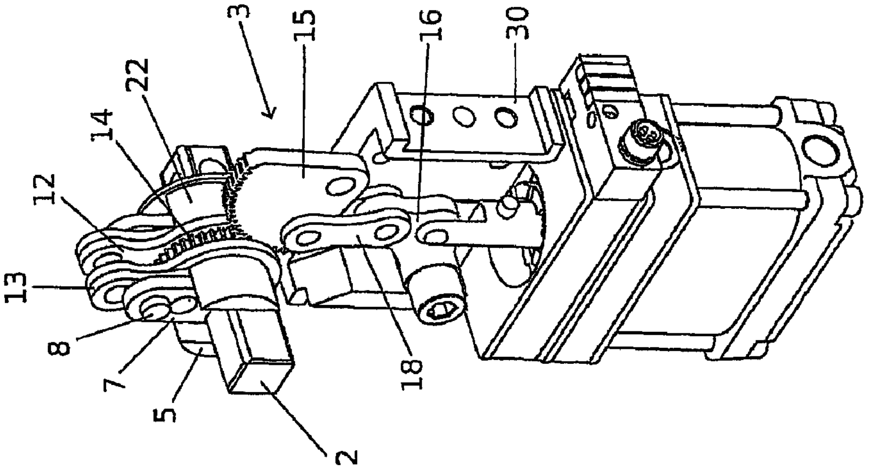
FIG. 4 is a partly dismounted perspective view of the clamping apparatus according to FIG. 1 in a locked clamping position.
Figure 8:
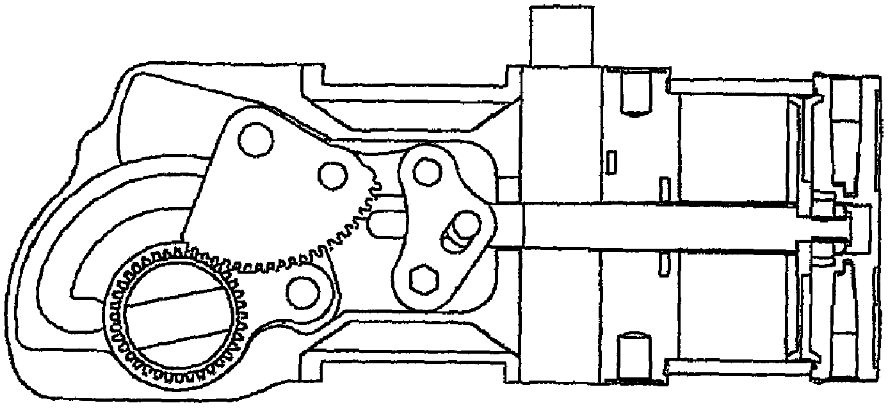
FIG. 8 is a sectional view of the clamping apparatus according to FIG. 1 in an open position.
Figure 7:
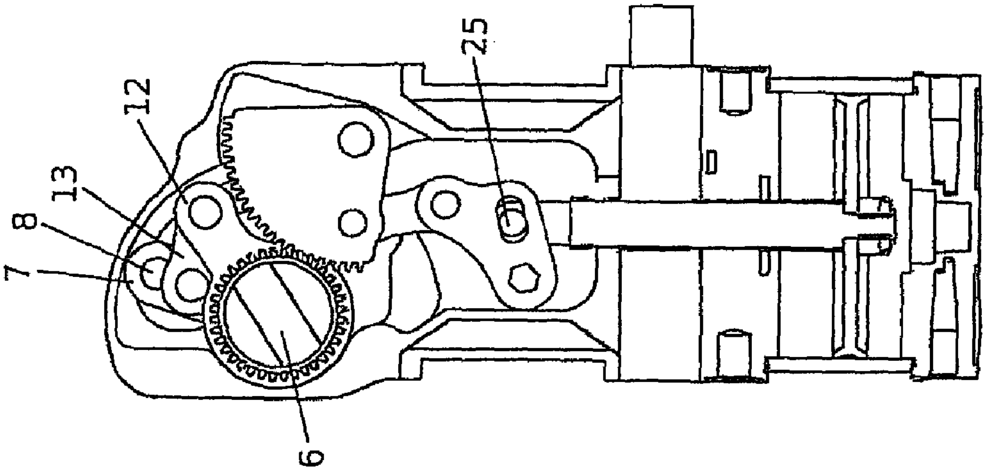
FIG. 7 is a sectional view of the clamping apparatus according to FIG. 1 in an intermediate position.

In order to be able to simply mount the clamping apparatus, the housing element 1 is formed from two housing shells, 19, 20 as seen in FIG. 5. The housing shells 19, 20 receive the guide element 5 between them. At the same time, the housing element 1 or the housing shells 19, 20 have an access opening 21 for the guide element 5. The opening 21 further has a cylindrical inner wall on the guide element side. The guide element 5 has at least one partially cylindrical outer wall 22 on the through opening side (see FIG. 4).

Figure 6:
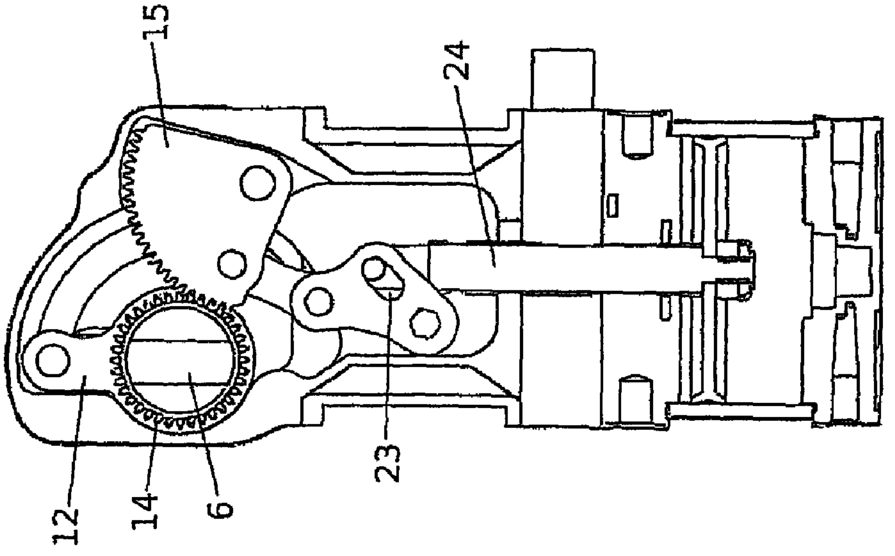
FIG. 6 is a sectional view of the clamping apparatus according to FIG. 1 in a locked clamping position (without the shaft) (in a different sectional plane compared to FIG. 1).

The guide element 5 has a through opening for the shaft 2 (see FIG. 6). The through opening 6 is configured as a positive connection to the shaft 2. In this regard, the shaft 2 (as shown in the figures) is configured to have a square cross-section. The through opening is configured to have a rectangular cross-section (approximately). This additionally has the result that all positions of the axis of rotation of the shaft 2 are arranged to run parallel to one another.

Figure 3:
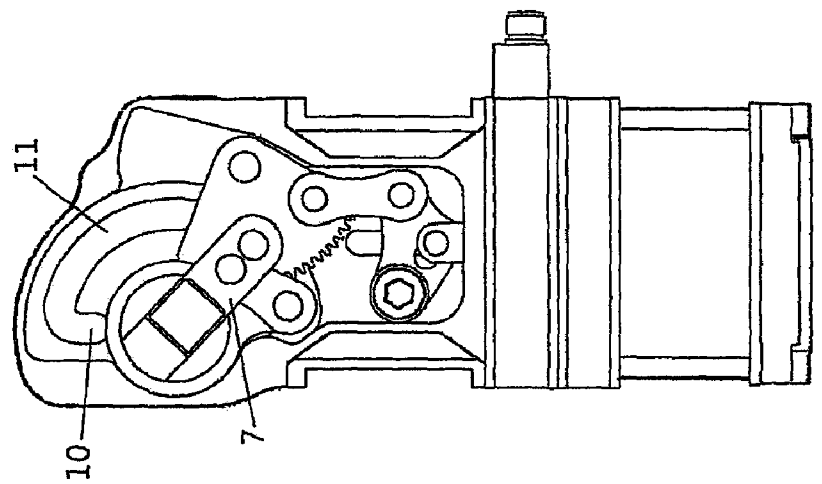
FIG. 3 is a sectional view of the clamping apparatus according to FIG. 1 in an open position.

According to the two exemplary embodiments shown in the figures, the drive mechanism 3 is connected to the actuating element 4. A lever arm 7, oriented perpendicular to the axis of rotation, is disposed on the shaft 2. A guide member 8 is disposed on the lever arm 7. The guide member 8 faces away from the shaft. A guide track 9 is disposed on the housing element 1 or on the housing shells 19, 20 to receive the guide member 8. The track 9 includes a first radially variable and a second radially constant guide region 10, 11 in relation to the axis of rotation, as seen in FIG. 3. In the first section 10 the guide member 8 can be located at radially different positions with respect to the axis of rotation. In the second section 11 it can only move about the axis of rotation on a (fixed) circumferential path.

As a comparison shows, in the embodiment shown in the figures, some of the aforesaid components are present in duplicate. These were not mentioned explicitly in the description merely for the sake of clarity. This also applies to the following description.

It is further provided that the guide element 5 is provided with a lever arm 12 oriented perpendicular to the axis of rotation. In addition, a lug 13 is disposed between the lever arm 7 on the shaft side and the lever arm 12 on the guide element side. The lug 13 is connected on the shaft side, at one end of the lever arm 7. On the other end it is connected to the lever arm 12, on the guide element side, in an articulated manner. In addition, the guide member 8 is disposed on one side and the tab 13 is disposed on another side of the lever arm 7 of the shaft 2.

The guide element 5 is provided with a gear wheel or at least with one gear wheel section 14 surrounding the guide element. The gear wheel section 14 is connected to the lever arm 12 in a torsionally rigid manner. The gear wheel section 14 is mounted together with the lever arm 12 so that it can be rotated on the guide element 5. Furthermore, an axis of rotation of the gear wheel section 14 is configured to run parallel to the axis of rotation of the shaft 2.

As is deduced from the figures, the guide element 5 is in principle, formed from two circular segments that extend depthwise. The shaft 2 is located between the two segments. The structural cohesion is obtained through the lever arm 12 and the gear wheel section 14. Each has a correspondingly large circular through opening. The shaft 2 is displaceable between the two circular-segment-shaped parts of the guide element 5 (parallel to the axis of rotation). The exact position will be determined by the guide member 8, running in the guide track 9, and the lug 13 connected both to the lever arm 7 and to the lever arm 12.

The gear wheel section 14 or the gear wheel is configured to cooperate with a tooth segment 15 to transmit a torque to the shaft 2. The tooth segment 15 is rotatably mounted in the housing element 1. The tooth segment 15 is preferably configured in a triangular or slice-of-cake shape. The tooth segment 15 is connected at its pointed end (apex), via a rotary joint 22, to the housing element 1 or the housing shells 19, 20.

A pivot lever 16 is disposed in the housing element 1. The pivot lever 16 can be pivoted about a pivot axis 17. The pivot axis 17 is located parallel to the axis of rotation. A lug 18 is arranged in an articulated manner on a region of the pivot lever 16 remote from the pivot axis. The lug 18 is connected, with its end remote from the pivot lever in an articulated manner, to the tooth segment 15. The lug 18, connected to the pivot lever 16, is disposed in an articulated manner on the tooth segment 15 at a distance from the rotary joint 22 of the tooth segment 15.

In order to be able to transmit an (adjusting) force to the pivot lever 16, the pivot axis 17 is either connected to a hand lever (accessible from outside) (not shown) or the pivot lever 16 is provided with a slit-shaped engagement region 23. In the exemplary embodiment according to FIGS. 1 to 8, a guide member 25, disposed on a piston rod 24 of a piston drive, is configured to engage in the engagement region 23. In the exemplary embodiment according to FIGS. 9 and 10, a guide member 25, disposed (not co-rotating) on a rotary spindle 26 of an electrical rotary drive, is configured to engage in this engagement region 23. The rotary spindle 26 is connected to the electrical rotary drive, via a belt drive 27.

With reference to FIG. 5, the housing element 1 has a head region 28. The head region 28 receives the guide element 5. A connecting region 29 receives the pivot lever 16. The connecting region 29 is preferably configured to be enclosed by two half-shell-shaped connecting parts 30 provided with hole patterns as required.

Alternatively to the two exemplary embodiments with gear wheels or rotary spindles shown in FIGS. 1 to 8 or 9 and 10, it is also possible to use a toggle lever mechanism. The toggle lever mechanism includes an intermediate member and a linear adjusting member. In this case, the intermediate member is connected to the lever arm 12, on the guide element side, in an articulated manner.

The functioning of the two exemplary embodiments will be briefly explained.

Figure 2:
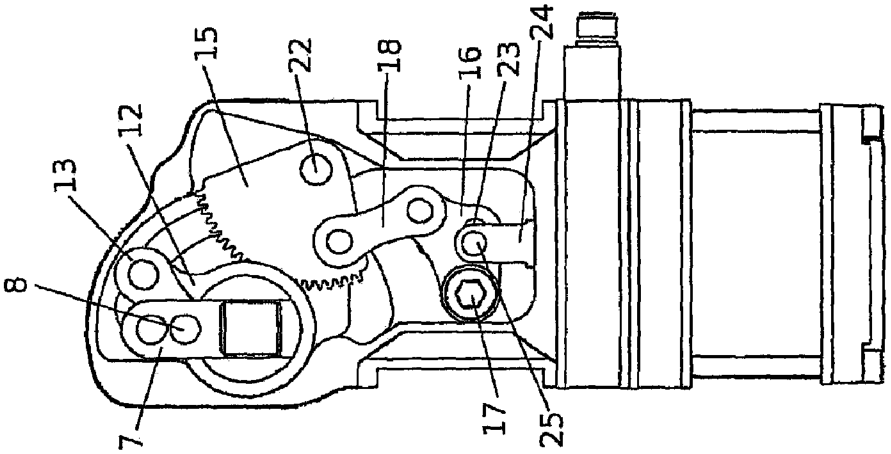
FIG. 2 is a sectional view of the clamping apparatus according to FIG. 1 in an unlocked clamping position.
Figure 1:
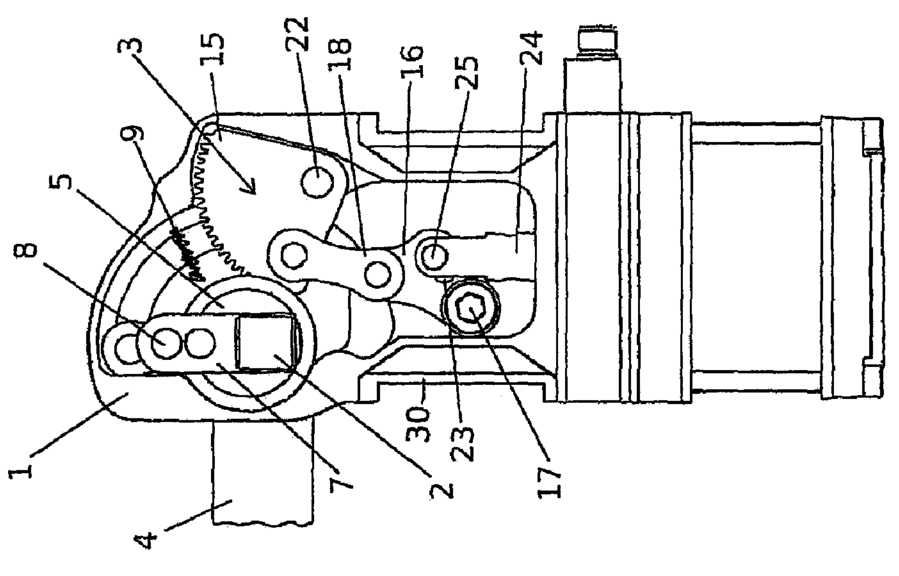
FIG. 1 is a sectional view of a first embodiment of the clamping apparatus according to the disclosure in a locked clamping position.

The starting point for the first exemplary embodiment is FIG. 3. FIG. 3 shows the open position of the clamping apparatus. The piston rod 24 is now moved upwards by the piston drive. This has a result of the guide member 25 moving inside the engagement region 23. As this occurs, the pivot lever 16 is rotated at the same time in a counterclockwise direction about the pivot axis 17. In addition, a force is transferred, via the lug 18, to the tooth segment 15. The tooth segment 15 begins to turn in a clockwise direction about its rotary joint 22. Additionally, the tooth segment 15 is positively engaged in the gear wheel section 14 or is meshed with it. The gear wheel section 14 together with the lever arm 12 on the guide element side is rotated in a counterclockwise direction. This rotary movement is also transferred, via the lug 13, to the shaft-side lever arm 7. The displacement position on the lever arm 7 inside the guide element 5 is at the same time fixed by means of the guide member 8 guided in the guide track 9. FIG. 2 shows an intermediate position where the actuating element 4 is no longer being pivoted, however, the final clamping position is not yet reached. The final position is shown in FIG. 1. Also, it follows, at the same time, that the actuating element 4 is locked in the clamping position by the rectilinear arrangement of the lever arms 7 and 12 and the lug 13, with respect to one another (as in an over center toggle lever arrangement).

Figure 10:
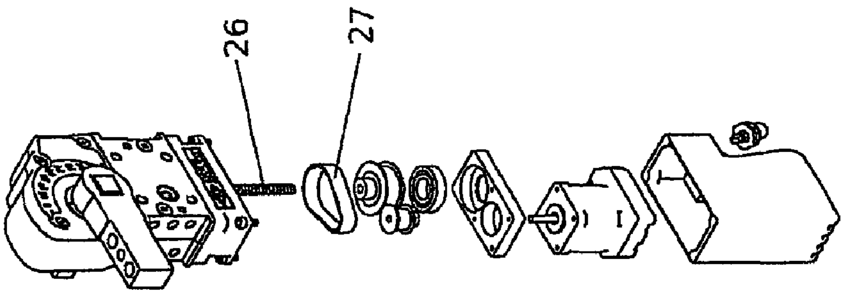
FIG. 10 is an exploded view on the drive side of the clamping apparatus according to FIG. 9.
Figure 9:
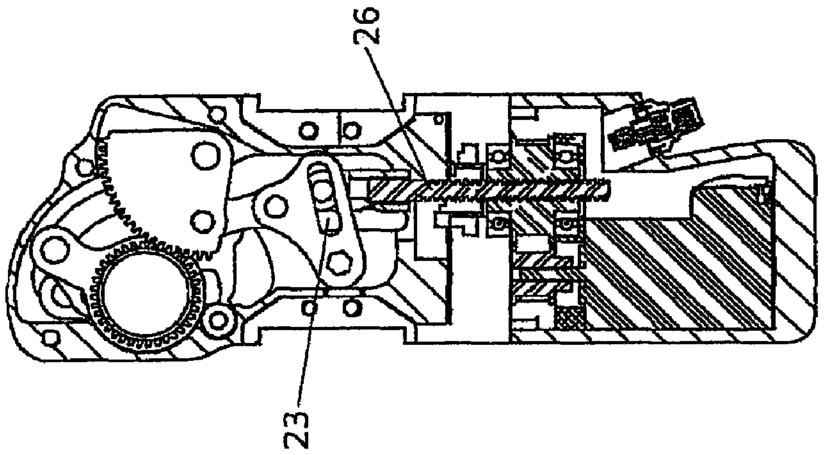
FIG. 9 is a sectional view of a second embodiment of the clamping apparatus according to the disclosure with an electrical drive.

The second exemplary embodiment shown in FIGS. 9 and 10 functions identically with regard to the connection between pivot lever 16 and shaft 2. The only difference is the drive of the guide member 25. In this case, it is disposed on the upper end of an axially adjustable rotary spindle 26. The spindle 26 is connected, via a belt drive 27, to an electrical rotary drive.

The description of the disclosure is merely exemplary in nature and thus, variations that do not depart from the gist of the disclosure are intended to be within the scope of the disclosure. Such variations are not to be regarded as a departure from the spirit and scope of the disclosure.

The invention claimed is:

1. A clamping apparatus comprising:

a shaft mounted in a housing element, the shaft is rotated about an axis of rotation, one end of the shaft is connected to a drive mechanism, the drive mechanism is disposed in the housing element, the other end of the shaft is connected to an actuating element in a torsion-proof manner; the shaft implements a rotational and translational movement to an actuating element, the shaft is mounted in a guide element, the shaft is movable in the guide element so that the shaft is displaceable in the guide element perpendicular to the axis of rotation, the guide element is connected to the drive mechanism, the guide element is rotatably mounted in the housing element so that as the guide element rotates, the shaft moves in the guide element perpendicular to the axis of rotation.

2. The clamping apparatus according to claim 1, where the guide element has a through opening for the shaft.

3. The clamping apparatus according to claim 2, wherein the through opening is configured as a positive connection to the shaft.

4. The clamping apparatus according to claim 2, wherein the shaft has a square configuration in cross-section and the through opening has a rectangular configuration in cross-section.

5. The clamping apparatus according claims 1, wherein a lever arm is oriented perpendicular to the axis of rotation and is disposed on the shaft.

6. The clamping apparatus according to claim 5, further comprising a guide member disposed on the lever arm facing away from the shaft.

7. The clamping apparatus according to claim 6, further comprising a guide track, for the guide member, disposed on the housing element.

8. The clamping apparatus according to claim 7, wherein the guide track comprises a first radially variable and a second radially constant guide region in relation to the axis of rotation.

9. The clamping apparatus according to claims 1, further comprising a lever arm, oriented perpendicular to the axis of rotation, disposed on the guide element.

10. The clamping apparatus according to claim 9, further comprising a lug disposed between the lever arm, on the shaft side, and the lever arm, on the guide element side.

11. The clamping apparatus according to claim 10, wherein the lug, in an articulated manner, is connected at one end to the lever arm on the shaft side and on the other end to the lever arm on the guide element side.

12. The clamping apparatus according to claim 1, wherein the guide element is provided with at least one gear wheel section.

13. The clamping apparatus according to claim 1, further comprising a pivot lever disposed in the housing element, the pivot lever can be pivoted about a pivot axis located parallel to the axis of rotation.

14. A clamping apparatus comprising:

a shaft mounted in a housing element, the shaft is rotated about an axis of rotation, one end of the shaft is connected to a drive mechanism, the drive mechanism is disposed in the housing element, the other end of the shaft is connected to an actuating element in a torsion-proof manner; the shaft implements a rotational and translational movement to an actuating element, the shaft is mounted in a guide element, the guide element is provided with at least one gear wheel section, and the gear wheel section is configured to cooperate with a tooth segment rotatably mounted in the housing element, the shaft is movable in the guide element so that the shaft is displaceable in the guide element perpendicular to the axis of rotation, the guide element is connected to the drive mechanism, the guide element is rotatably mounted in the housing element so that as the guide element rotates, the shaft moves in the guide element perpendicular to the axis of rotation.

15. A clamping apparatus comprising:

a shaft mounted in a housing element, the shaft is rotated about an axis of rotation, one end of the shaft is connected to a drive mechanism, the drive mechanism is disposed in the housing element, the other end of the shaft is connected to an actuating element in a torsion-proof manner; the shaft implements a rotational and translational movement to an actuating element, the shaft is mounted in a guide element with a tooth segment, the shaft is movable in the guide element so that the shaft is displaceable in the guide element perpendicular to the axis of rotation, the guide element is connected to the drive mechanism, the guide element is rotatably mounted in the housing element so that as the guide element rotates, the shaft moves in the guide element perpendicular to the axis of rotation;

a pivot lever disposed in the housing element, the pivot lever can be pivoted about a pivot axis located parallel to the axis of rotation; and a lug, arranged in an articulated manner, on a region of the pivot lever remote from the pivot axis, the lug is connected with its end remote from the pivot lever in an articulated manner to the tooth segment.

* * * * *